United States Patent
Lim et al.

(10) Patent No.: US 7,321,690 B2
(45) Date of Patent: Jan. 22, 2008

(54) DEVICE AND METHOD FOR DETECTING BLURRING OF AN IMAGE

(75) Inventors: Chae-Whan Lim, Taegukwangyok-shi (KR); Nam-Chul Kim, Taegukwangyok-shi (KR); Ick-Hoon Jang, Kumi-shi (KR); Chong-Heun Kim, Kyongsangbuk-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 738 days.

(21) Appl. No.: 10/765,069

(22) Filed: Jan. 28, 2004

(65) Prior Publication Data

US 2004/0252890 A1   Dec. 16, 2004

(30) Foreign Application Priority Data

Jan. 30, 2003   (KR) .................... 10-2003-0006422

(51) Int. Cl.
*G06K 9/46* (2006.01)
(52) U.S. Cl. .................... 382/191; 382/250; 708/402
(58) Field of Classification Search ............... 382/190, 382/191, 250; 708/402
See application file for complete search history.

(56) References Cited

U.S. PATENT DOCUMENTS

| | | | |
|---|---|---|---|
| 5,920,349 A | 7/1999 | Okino et al. | |
| 5,995,657 A | 11/1999 | Sunakawa | |
| 7,054,461 B2 * | 5/2006 | Zeller et al. | ................ 382/100 |

OTHER PUBLICATIONS

Chaddha N et al.: "Text Segmentation in Mixed-Mode Images"; Signals, Systems and Computers, 1994. 1994 Conference record of the 28th Asilomar Conference on Pacific Grove, CA, USA Oct. 31-Nov. 2, 1994, Los Alamitos, CA, USA, IEEE Comput. Soc. US., vol. 2, Oct. 31, 1994, pp. 1356-1361, XP010148798I: ISBN: 0-8186-6405-3.

* cited by examiner

*Primary Examiner*—Matthew C. Bella
*Assistant Examiner*—G. F. Cunningham
(74) *Attorney, Agent, or Firm*—Roylance, Abrams, Berdo & Goodman, L.L.P.

(57) ABSTRACT

A device and method for determining whether or not an image is blurred. The device and method comprises an input part for receiving an image; a block classification part for dividing the received image into blocks and classifying the divided blocks into character blocks and background blocks; a character block energy calculation part for calculating an average energy ratio of the character blocks; and a blurring detection part for calculating an average energy ratio of the character blocks and determining whether or not the image is blurred based on a comparison of the average energy ratio with a predetermined threshold.

12 Claims, 14 Drawing Sheets

FIG.3C

|   | L | H | H | H | H | H |   |
|---|---|---|---|---|---|---|---|
| L | H | H | H | H | H |   |   |
| H | H | H | H | H |   |   |   |
| H | H | H | H |   |   |   |   |
| H | H | H |   |   |   |   |   |
| H | H |   |   |   |   |   |   |
| H |   |   |   |   |   |   |   |
|   |   |   |   |   |   |   |   |

FIG.6A

|   | L | L | H | H | H | H |   |
|---|---|---|---|---|---|---|---|
| L | L | H | H | H | H |   |   |
| L | H | H | H | H |   |   |   |
| H | H | H | H |   |   |   |   |
| H | H | H |   |   |   |   |   |
| H | H |   |   |   |   |   |   |
| H |   |   |   |   |   |   |   |
|   |   |   |   |   |   |   |   |

FIG.6B

|   | L | L | L | H | H | H |   |
|---|---|---|---|---|---|---|---|
| L | L | L | H | H | H |   |   |
| L | L | H | H | H |   |   |   |
| L | H | H | H |   |   |   |   |
| H | H | H |   |   |   |   |   |
| H | H |   |   |   |   |   |   |
| H |   |   |   |   |   |   |   |
|   |   |   |   |   |   |   |   |

FIG.6C

|   | L | L | L | L | H | H |   |
|---|---|---|---|---|---|---|---|
| L | L | L | L | H | H |   |   |
| L | L | L | H | H |   |   |   |
| L | L | H | H |   |   |   |   |
| L | H | H |   |   |   |   |   |
| H | H |   |   |   |   |   |   |
| H |   |   |   |   |   |   |   |
|   |   |   |   |   |   |   |   |

FIG.6D

DEVICE AND METHOD FOR DETECTING BLURRING OF AN IMAGE

PRIORITY

This application claims priority under 35 U.S.C. § 119 to an application entitled "Device and Method for Detecting Blurring of Image" filed in the Korean Intellectual Property Office on Jan. 30, 2003 and assigned Serial No. 2003-6422, the contents of which are incorporated herein by reference.

BACKGROUND OF THE INVENTION

1. Field of the Invention

The present invention relates generally to a device and method for preprocessing an image signal, and in particular, to a preprocessing device and method for determining whether or not an image is blurred, prior to recognizing characters in the image.

2. Description of the Related Art

Generally, a preprocessing operation is performed to recognize characters in an image. The "preprocessing operation" refers to an operation of processing an image before recognition of characters in the image occurs. The image preprocessing operation can include an operation of determining whether or not an input image is appropriate for character recognition, correcting a skew of an input image, properly correcting a size of an input image, and binarizing an image signal so that characters of the image signal can be recognized.

An image input for the preprocessing can be an image photographed through a camera. When an object is defocused or irregularly illuminated during photographing, the photographed image becomes blurred. Recognizing characters in such a blurred image causes an increase in the misrecognition rate. Therefore, it is preferable to determine whether or not an input image is blurred, before recognizing characters in the image. If a resolution of the image is too low to recognize characters therein, it is preferable to interrupt a recognition operation and then request re-input of the image.

SUMMARY OF THE INVENTION

It is, therefore, an object of the present invention to provide a device and method for determining whether or not an image is blurred, prior to recognizing characters in the image, in a device for recognizing characters in an image.

It is another object of the present invention to provide a device and method for determining whether or not an image is blurred, by classifying an input image into character blocks and background blocks and analyzing only the character blocks, in a device for recognizing characters in an image.

It is further another object of the present invention to provide a device and method for determining whether or not an image is blurred, by classifying an input image into character blocks and background blocks and analyzing an energy ratio of the character blocks, in a device for recognizing characters in an image.

To substantially achieve the above and other objects, a device provides for determining whether or not an image is blurred. The device comprises an input part for receiving an image; a block classification part for dividing the received image into blocks and classifying the divided blocks into character blocks and background blocks; a character block energy calculation part for calculating an average energy ratio of the character blocks; and a blurring detection part for calculating an average energy ratio of the character blocks and determining whether or not the image is blurred by comparing the average energy ratio with a predetermined threshold.

BRIEF DESCRIPTION OF THE DRAWINGS

The above and other objects, features and advantages of the present invention will become more apparent from the following detailed description when taken in conjunction with the accompanying drawings in which:

FIGS. 3A through 3C are diagrams illustrating a method of setting points of dominant Discrete Cosine Transform (DCT) coefficients by the energy calculation part of FIG. 2 according to an embodiment of the present invention;

FIGS. 6A through 6F are diagrams illustrating DCT coefficients used when calculating an energy ratio of DCT coefficients in a character block, and a corresponding characteristic according to an embodiment of the present invention;

DETAILED DESCRIPTION OF THE PREFERRED EMBODIMENT

In the following description, specific details such as a size of an image and sizes of character and background blocks are provided as examples. It should be obvious to those skilled in the art that the invention can be easily implemented without the examples or with modifications to the examples.

In the following description of embodiments of the present invention, an input image is assumed to have a size of 640×480 pixels. The term "block" refers to character and background blocks, and herein, it is assumed that each of the blocks has a size of 8×8 pixels.

Embodiments of the present invention will now be described in detail with reference to the accompanying drawings.

Figure 1:
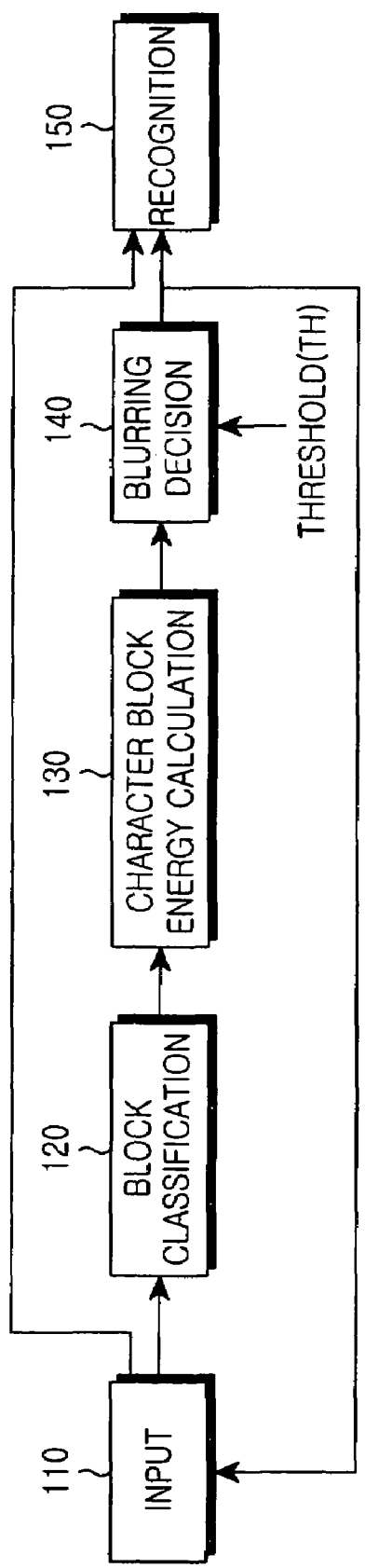
FIG. 1 is a block diagram illustrating a structure of a device for detecting blurring of an image according to an embodiment of the present invention.

FIG. 1 is a block diagram illustrating a structure of a device for detecting blurring of an image according to an embodiment of the present invention. Referring to FIG. 1, an input part 110 can be a communication interface and a computer including a camera, a scanner, a modem and a network. It is assumed herein that the image is formed of 640 (columns)×480 (rows) pixels.

A block classification part 120 divides an image received from the input part 110 into blocks, and classifies the divided blocks into character blocks (CB) and background blocks (BB). The block classification part 120 classifies the blocks into character blocks and background blocks to determine whether or not the image is blurred, by using only the region where characters are included. As mentioned above, it is assumed herein that the block has a size of 8×8 pixels.

An average character block energy calculation part 130 calculates an average energy ratio of character blocks output from the block classification part 120. The reason for calculating an average energy ratio of character blocks is to determine whether or not the image is blurred, by calculating an average energy ratio of character blocks forming the image to thereby use only the regions where characters are included.

A blurring detection part (or decision-on-blurring part) 140 determines whether or not the image is blurred, by comparing the average energy ratio of character blocks output from the average character block energy calculation part 130 with a predetermined threshold. If it is determined that the image is blurred, the blurring detection part 140 requests re-input of the image by notifying the input part 110 of the detection result.

A recognition part 150 recognizes characters in the image output from the input part 110, if a non-blurred image decision signal is received from the blocking detection part 140.

Figure 2:
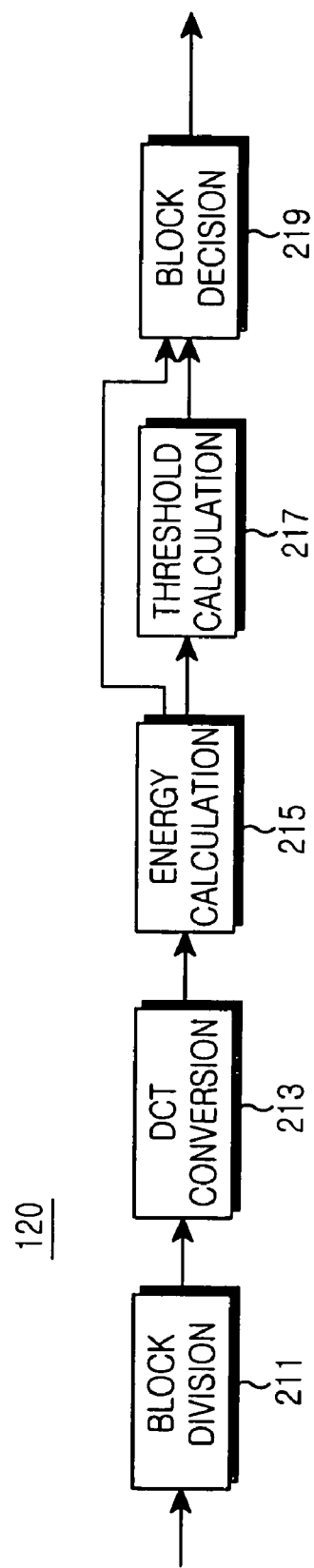
FIG. 2 is a detailed block diagram illustrating a structure of the block classification part of FIG. 1 according to an embodiment of the present invention.

FIG. 2 is a detailed block diagram illustrating a structure of the block classification part 120 of FIG. 1. The block classification part 120 divides the image in blocks with a predetermined size, and classifies the blocks into character blocks and background blocks. The block classification part 120 classifies the blocks in order to use only the region where the characters are included in determining whether or not the image is blurred.

Referring to FIG. 2, a block division part 211 divides the image into blocks with a predetermined size. If the image has a size of 640×480 pixels and each of the blocks has a size of 8×8 pixels, the block division part 211 divides the image into 4800 blocks.

The blocks output from the block division part 211 are applied to a discrete cosine transform (DCT) conversion part 213 where they are subjected to DCT conversion. An energy calculation part 215 calculates the sum of the absolute values of dominant DCT coefficients in the DCT-converted blocks. An energy distribution value of DCT coefficients for the character blocks is larger than that of the background blocks.

Figure 3A:
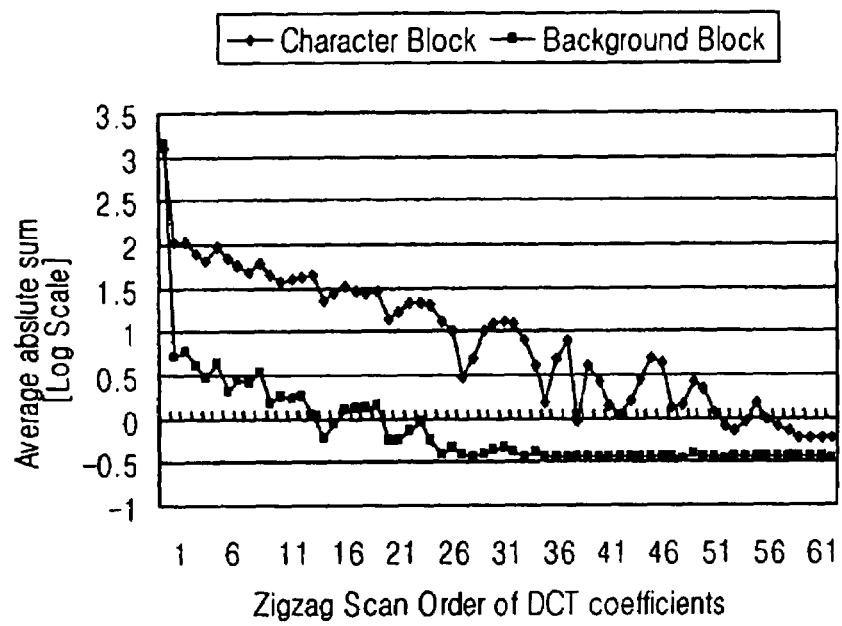
Figure 3B:
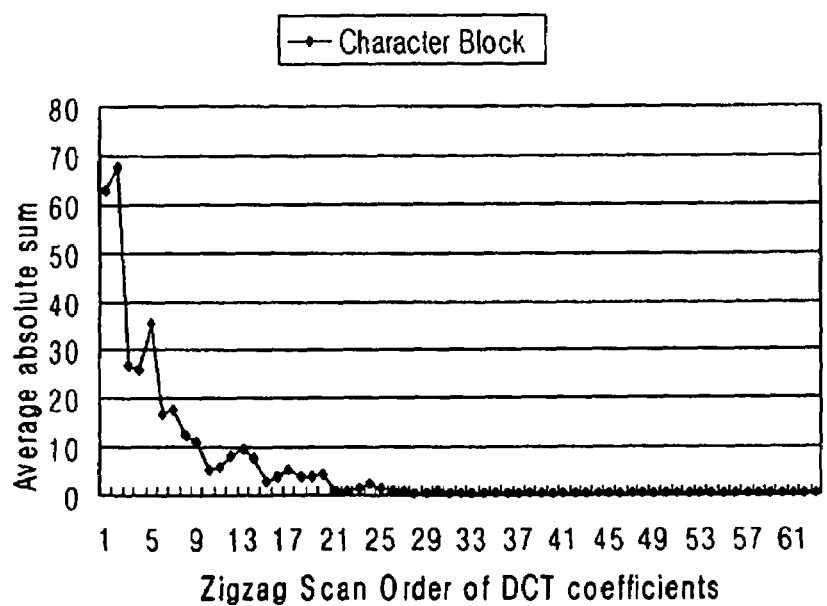
Figure 3C:
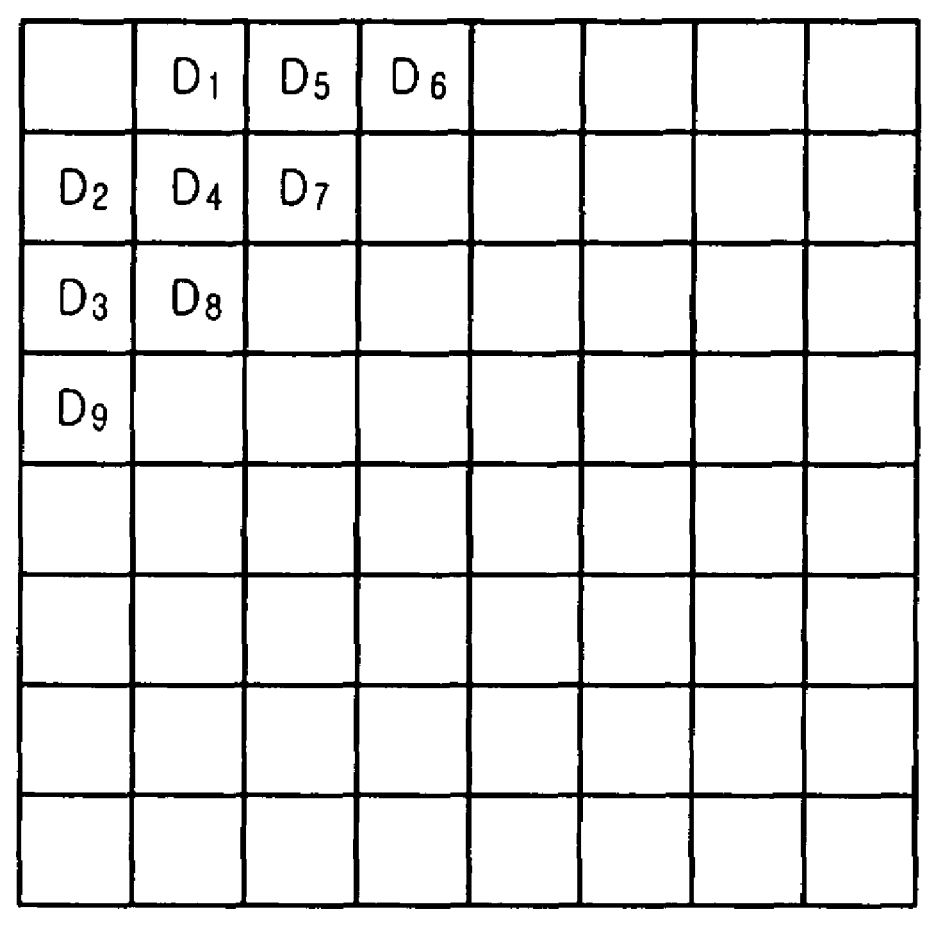

FIG. 3A is a diagram illustrating a comparison of energy distributions of DCT coefficients for character blocks and background blocks. In FIG. 3A, a Y axis represents an average sum of the absolute values in a log scale, and an X axis represents a zigzag scan order of DCT coefficients. As illustrated in FIG. 3A, it is noted that DCT coefficients for the character blocks have larger values than the DCT coefficients for the background blocks. FIG. 3B is a diagram illustrating energy distribution of DCT coefficients for the character blocks. In FIG. 3B, a Y axis represents an average sum of the absolute values in a normal scale, and an X axis represents a zigzag scan order of DCT coefficients. As illustrated in FIG. 3B, it is noted that some of the DCT coefficients have a large average sum of the absolute values. Therefore, in the embodiment of the present invention, it is assumed that dominant DCT coefficients used during block classification are $D_1$ to $D_9$ as illustrated in FIG. 3C. Accordingly, the sum of absolute values for the dominant DCT coefficients in a $k^{th}$ block can be calculated by $$S^k = \sum_{i=1}^{9} |D_i^k| \qquad (1)$$

In Equation (1), $|D_i^k|$ denotes an $i^{th}$ dominant DCT coefficient of the $k^{th}$ block, and $S^k$ denotes the sum of the absolute values of the dominant DCT coefficients in the $k^{th}$ block. Thus, in the embodiment of the present invention, a sum of the dominant DCT coefficients $D_1$ to $D_9$ is calculated.

The energy calculation part 215 performs the calculation of Equation (1) on all blocks (at k=0, 1, 2, ..., 4799). Energy values $S^k$ (k=0, 1, 2, ..., 4799) calculated block by block are applied to a threshold calculation part 217.

The threshold calculation part 217 in FIG. 2 sums up the energy values $S^k$ (k=0, 1, 2, ..., 4799) calculated block by block, and calculates an average value $<S^k>$ by dividing the summed energy value for all the blocks by the total number TBN of blocks. The average value $<S^k>$ is calculated by Equation (2) below. The average value $<S^k>$ becomes a threshold Cth used in determining whether the blocks are character blocks or background blocks.

$$\langle S^k \rangle = \frac{1}{TBN} \sum_{k=1}^{TBN} S^k \qquad (2)$$
$$= Cth$$

In Equation (2), TBN denotes the total number of blocks.

A block decision part 219 sequentially receives energy values (the sums of absolute values of the dominant DCT coefficients) of the respective blocks, output from the energy calculation part 215, and classifies the blocks as character blocks or background blocks by comparing the received block energy values with the threshold Cth. As shown in Equation (3) below, the block decision part 219 classifies the $k^{th}$ block as a character block if $S^k \geq Cth$, and classifies the $k^{th}$ block as a background block if $S^k < Cth$.

IF $S^k \geq$ Cth then CB else BB $\qquad (3)$

Figure 3D:
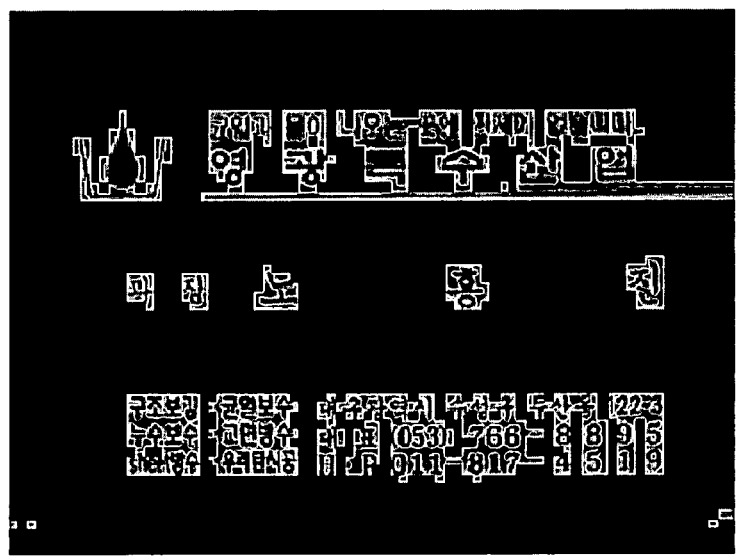
FIGS. 3D and 3E are diagrams illustrating examples of images classified into character blocks and background blocks according to an embodiment of the present invention.
Figure 3E:

Shown in FIGS. 3D and 3E are the final results classified by the block classification part 120 into the character blocks and the background blocks. In FIGS. 3D and 3E, gray regions correspond to the character blocks, while block regions correspond to background blocks.

Pixels of the blocks classified by the block classification part 120 can have gray levels between 0 and 255. An image of a character block output from the block classification part 120 is input to the average character block energy calculation part 130. The average character block energy calculation part 130 calculates an energy ratio of each of the character blocks, and then calculates an average energy ratio of the character blocks in the entire image, using the calculated energy ratios.

Figure 4:
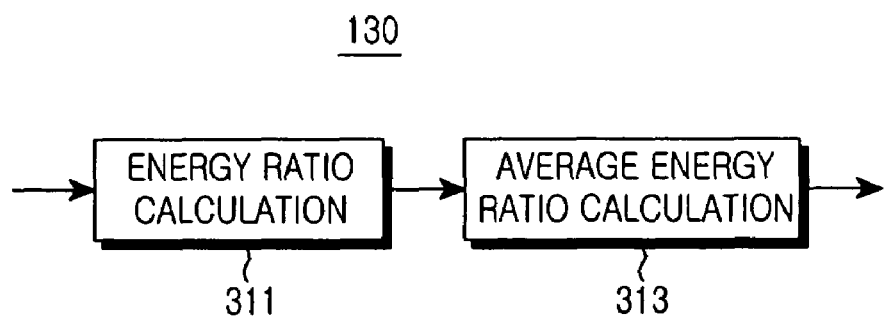
FIG. 4 is a detailed block diagram illustrating a structure of the character block energy calculation part of FIG. 1 according to an embodiment of the present invention.
Figure 5:
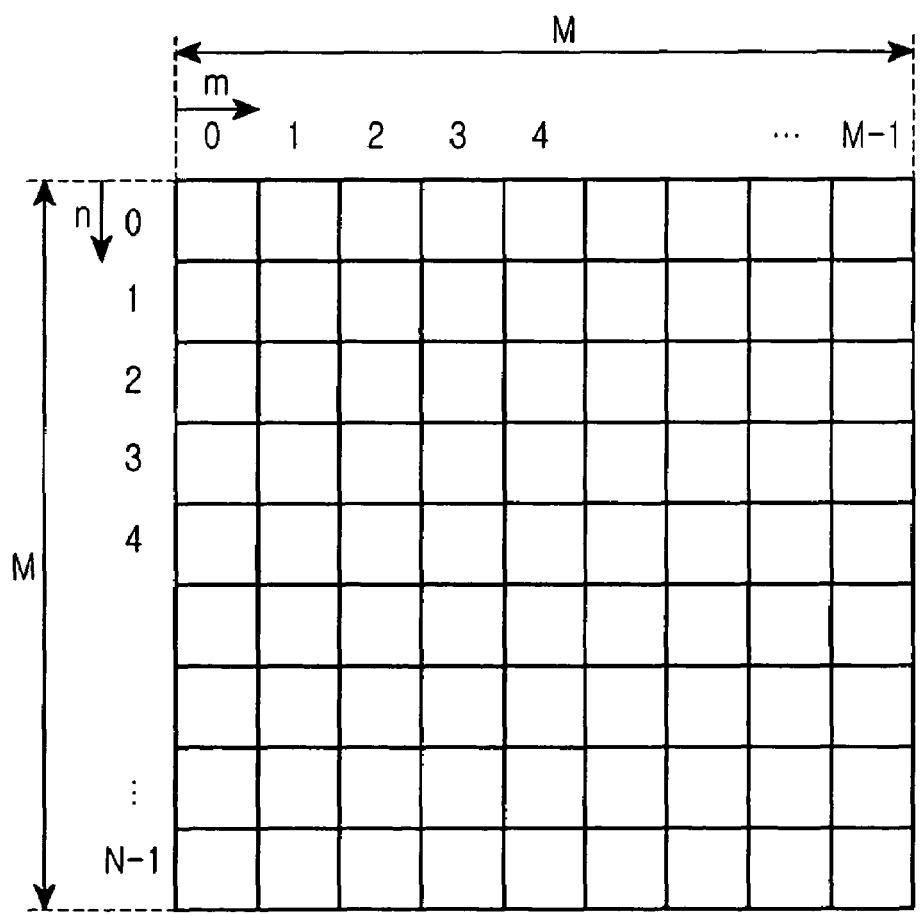
FIG. 5 is a diagram illustrating points of DCT coefficients in an M×M character block.

FIG. 4 is a detailed block diagram illustrating a structure of the character block energy calculation part 130. Referring to FIG. 4, an energy ratio calculation part 311 calculates an energy ratio of the DCT coefficients in each of the character blocks classified by the block classifier 120. FIG. 5 is a diagram illustrating positions of DCT coefficients in an M×M character block. In this case, a ratio of the DCT coefficients for the character block can be calculated by $$R^k = \frac{\sum_m \sum_n |L^k_{m,n}|}{\sum_{(m,n) \in \Omega_L} |L^k_{m,n}| + \sum_{(m,n) \in \Omega_H} |H^k_{m,n}|} \quad (4)$$

where, $$\Omega_L = \left\{ (m, n) \mid m, n = 0, \ldots, M-1, m+n = 1, \ldots, \frac{M}{4} \right\};$$

$$\Omega_H = \left\{ (m, n) \mid m, n = 0, \ldots, M-1, m+n = \frac{M}{4}+1, \ldots, \frac{3M}{4} \right\};$$

$L_{m,n}^k$ denotes a DCT coefficient of a low-frequency component in a (m, n) point of the $k^{th}$ block; and $H_{m,n}^k$ denotes a DCT coefficient of a high-frequency component in a (m, n) point of the $k^{th}$ block.

Figures 6E, 6F:
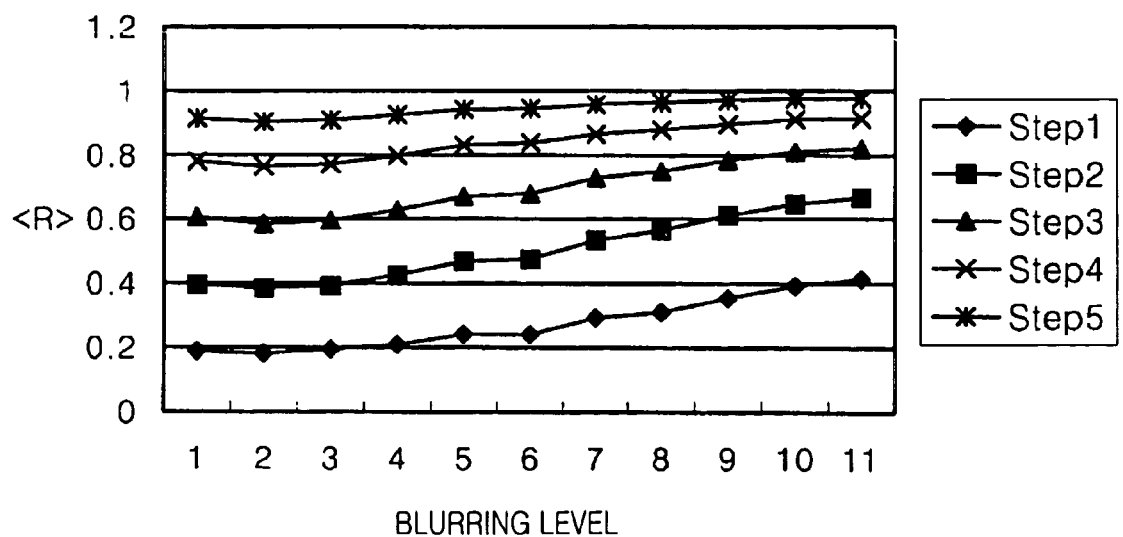

As mentioned above, it is assumed herein that each block has a size of 8×8 pixels (i.e., M=8). FIGS. 6A through 6F are diagrams illustrating experimental results provided to verify propriety of selecting positions of the DCT coefficients of a low-frequency component and a high-frequency component, used to calculate an energy ratio of the character blocks. Specifically, FIGS. 6A through 6E are diagram illustrating positions of the DCT coefficients classified by steps, for calculating a DCT energy ratio in each character block, and FIG. 6F is a diagram illustrating blurring variations classified by steps, according to the DCT coefficients classified by steps. The experimental results show variations in average energy ratios of the character blocks by increasing a blurring level. From the experimental results, it can be noted that the result average energy ratio obtained using the DCT coefficients of FIG. 6B is most sensitive to the variation in the blurring level. In the embodiment of the present invention, it is assumed that the DCT coefficients of FIG. 6B are used to calculate an energy ratio of the DCT coefficients in the character blocks.

Figures 7, 8:
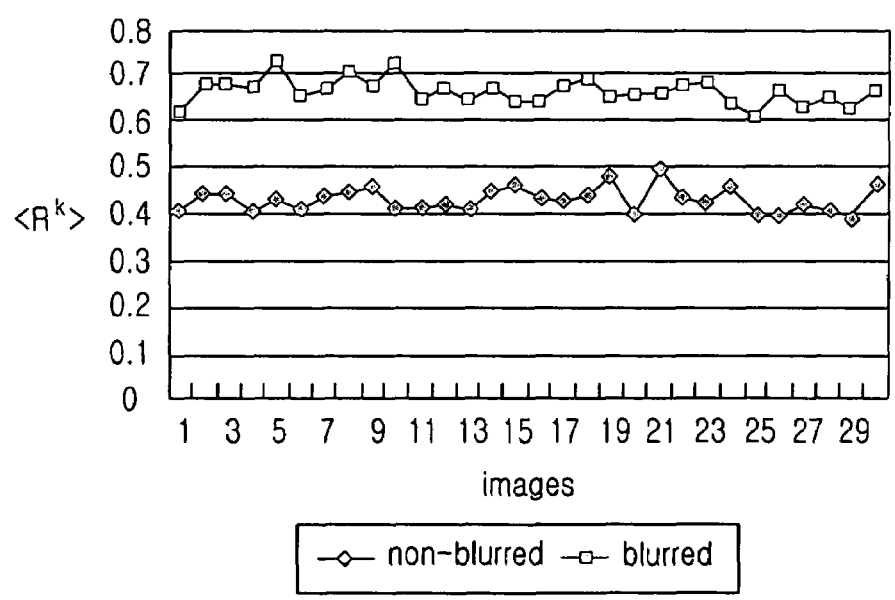
FIG. 7 is a diagram illustrating DCT coefficients used when calculating an energy ratio of DCT coefficients in an 8×8 character block according to an embodiment of the present invention.
FIG. 8 is a diagram illustrating distribution of an average energy ratio for the DCT coefficients of FIG. 7.

In the embodiment of the present invention, DCT coefficients used for calculating an energy ratio of DCT coefficients of each character block are shown in FIG. 7. In this case, in Equation (4) above, $L_{m,n}$ corresponds to DCT coefficients of low-frequency components at points where m+1=1 and 2, and $H_{m,n}$ corresponds to DCT coefficients of high-frequency components at points where m+n=3, 4, 5 and 6.

In this manner, the energy ratio calculation part 311 calculates an energy ratio $R^k$ of DCT coefficients for each character block using Equation (4) above. An average energy ratio calculation part 313 calculates an average energy ratio $<R^k>$ for the DCT coefficients of a full image. In other words, the average energy ratio calculation part 313 calculates the average energy ratio $<R^k>$ for the DCT coefficients of the full image using the energy ratios $R^k$ calculated by the energy ratio calculation part 311 as in the following Equation (5).

$$\langle R^k \rangle = \frac{1}{TCN} \sum_{k=1}^{TCN} R^k \quad (5)$$

In Equation (5), TCN denotes the total number of character blocks.

If the average energy ratio $<R^k>$ for the full image has been calculated as described above, the blurring detection part 140 compares the average energy ratio $<R^k>$ with an experimentally obtained threshold Bth as shown in Equation (6) below, and then determines whether the input image is blurred or not. In other words, if $<R^k> \geq$ Bth, the blurring detection part 140 determines that the input image is blurred, and then requests the input part 110 to re-input the image. On the other hand, if $<R^k>$ > Bth, the blurring detection part 140 determines that the input image is not blurred, and then and provides a notification of this to a recognition part 150 so that the input image can be recognized.

IF $<R^k> \geq$ Bth then blurred image else non-blurred image (6)

In Equation (6), the threshold Bth is selected according to whether character information of the image can be visually recognized or not and performance of a binarization output.

FIG. 8 is a diagram illustrating application results of Equation (5) for a blurred image and a non-blurred image. In FIG. 8, a horizontal axis represents different image samples, while a vertical axis represents an average energy ratio $<R^k>$. It can be noted from FIG. 8 that a blurred image and a non-blurred image show different distributions over the average energy ratio $<R^k>$. This illustrates that applying Equation (5) for decision on blurring (or blurring detection) is reasonable.

Figure 9:
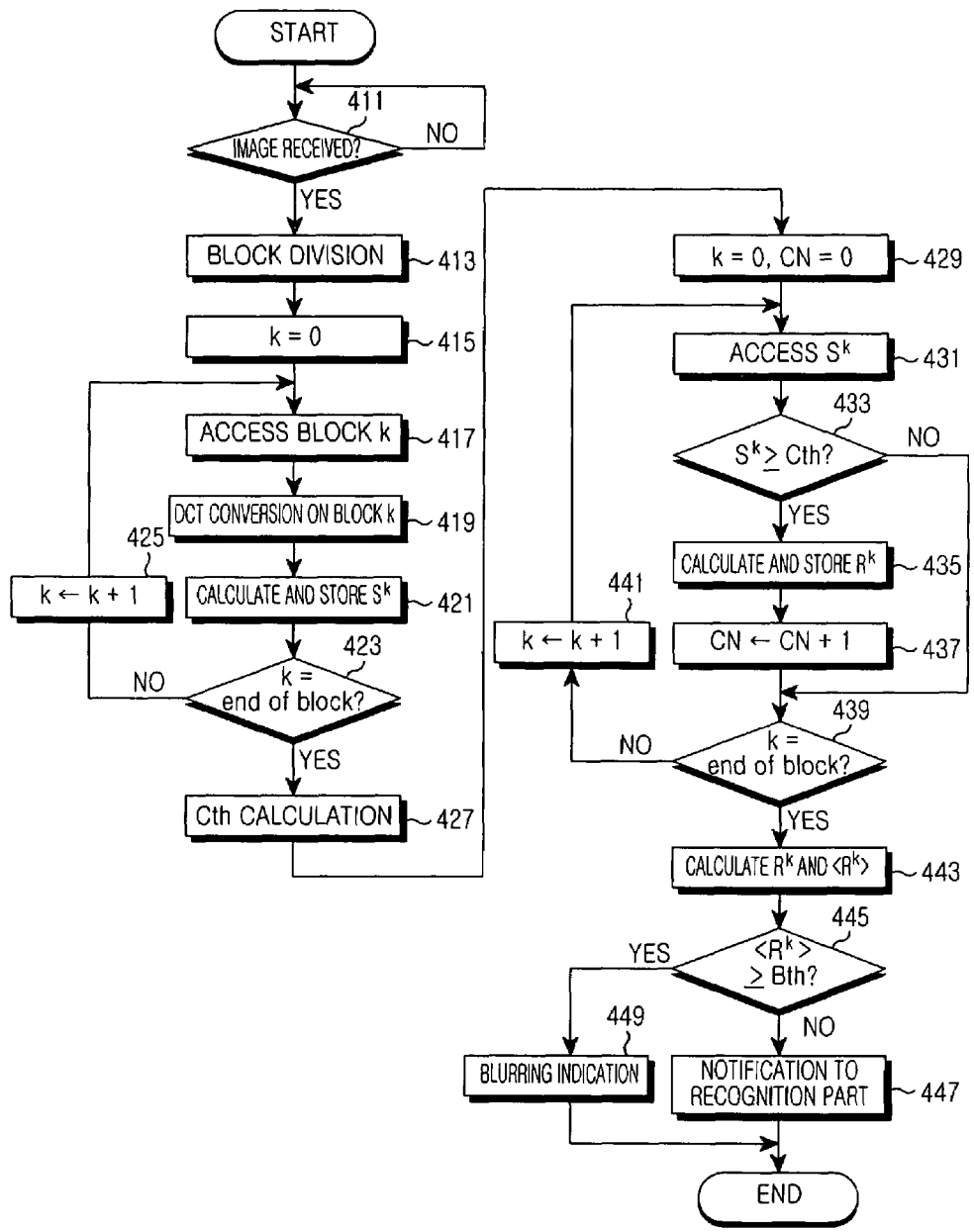
FIG. 9 is a flowchart illustrating a procedure for detecting blurring of an image according to an embodiment of the present invention.

FIG. 9 is a flowchart illustrating a procedure for detecting blurring of an image according to an embodiment of the present invention. Referring to FIG. 9, an input image is detected in step 411, and the input image is divided into blocks having a predetermined size in step 413. It is assumed herein that the image has a size of 640×480 pixels, and each of the blocks has a size of 8×8 pixels. Thus, it can be understood that the image is divided into 4800 blocks.

Thereafter, a block number BN is set to 0 in step 415, and a block with the block number BN is accessed in step 417. The accessed block #BN is DCT-converted in step 419, and then, the sum $S^k$ of absolute values of dominant DCT coefficients in the DCT-converted block #BN is calculated and stored in step 421. At this point, an energy distribution value of DCT coefficients in the character block has a larger value than that of the background block, and energy distributions of the DCT coefficients for the character block and the background block have the characteristics shown in FIG. 3A. Energy distribution of the DCT coefficients for the character block shows a characteristic of FIG. 3B. Therefore, the sum $S^k$ of absolute values of the DCT coefficients in the block #BN can be calculated using Equation (1). Here, k is the same parameter as BN, and denotes a block number. After the $S^k$ is calculated in step 421, it is determined in step 423 whether $S^k$ of the last block is calculated. If $S^k$ of the last block is not calculated, the block number is increased by one in step 425, and then the procedure returns to step 417 to repeat the operation stated above.

By repeatedly performing the steps 417 to 423, each block image is DCT-converted by performing the calculation of Equation (1) on all blocks (k=0, 1, 2, ..., 4799). In step 427, a threshold Cth is calculated using energy values $S^k$ (k=0, 1, 2, ..., 4799) of the respective blocks. In the process of calculating the threshold Cth in step 427, energy values $S^k$ (k=0, 1, 2, ..., 4799) calculated for the respective blocks are first summed, and then an average value $<S^k>$ is calculated by dividing the summed energy value of all the blocks by the total number TBN of blocks in accordance with Equation (2). The calculated average value $<S^k>$ becomes a threshold Cth used for determining whether the image block is a character block or a background block.

After the threshold Cth is calculated, an operation of classifying the blocks into character blocks and background blocks is performed. Subsequently, energy ratios $R^k$ of DCT coefficients for the character blocks are calculated. Herein, the bock number is represented by BN, and a character block number is represented by CN. Thus, in step 429, the block number BN and the character block number CN are both initialized to 0, and thereafter, in step 431, $S^k$ of a block corresponding to the block number BN is accessed. In step 433, a $S^k$ value of an input block #BN is classified as a character block or a background block using the threshold Cth in accordance with Equation (3). In step 433, if $S^k \geq$ Cth, a corresponding block #BN is classified as a character block, and if $S^k<$Cth, the corresponding block #BN is classified as a background block. If the corresponding block is classified as a character block, the energy ratio calculation part 311 calculates an energy ratio $R^k$ of the DCT coefficients for the corresponding block using Equation (4) in step 435, and then increases the character block number CN by one in step 437. That is, in the embodiment of the present invention, an energy ratio $R^k$ of the DCT coefficients is calculated only for the classified character blocks. The energy ratio $R^k$ is calculated as follows. First, DCT coefficients of respective low-frequency components are added to DCT coefficients shown in FIG. 7 ($\Sigma_m \Sigma_{n(m,n) \in \Omega_L} |L_{m,n}^k|$), and DCT coefficients of respective high-frequency components are also added to the DCT coefficients of FIG. 7 ($\Sigma_m \Sigma_{n(m,n) \in \Omega_H} |H_{m,n}^k|$). Second, the sum of the DCT components of the low-frequency components and the DCT components of FIG. 7 is added to the sum of the DCT components of the high-frequency components and the DCT components of FIG. 7 ($\Sigma_m \Sigma_{n(m,n) \in \Omega_L} |L_{m,n}^k| + \Sigma_m \Sigma_{n(m,n) \in \Omega_H} |H_{m,n}^k|$). Third, the energy ratio $R^k$ of the corresponding character block is determined by dividing the sum $\Sigma_m \Sigma_{n(m,n) \in \Omega_L} |L_{m,n}^k|$ of the DCT components of the low-frequency components and the DCT components of FIG. 7 by the sum $\Sigma_m \Sigma_{n(m,n) \in \Omega_L} |L_{m,n}^k| + \Sigma_m \Sigma_{n(m,n) \in \Omega_H} |H_{m,n}^k|$ of the DCT components added in the second step.

Thereafter, it is determined in step 439 whether the classified block is the last block (or end of block). If the classified block is the last block, the block number is increased by one in step 441, and then the procedure returns to step 431 to repeat the operation stated above. When such an operation is completed, an operation of classifying input image blocks into character blocks and background blocks is ended. In this state, energy ratios of the DCT coefficients have been calculated for the classified character blocks.

After the energy ratios of the DCT coefficients for all character blocks are calculated, an average value $<R^k>$ of the DCT coefficients for the character blocks is calculated in step 443 in accordance with Equation (5). The average energy ratio $<R^k>$ for the character blocks of the image is calculated by summing all the energy ratios $R^k$ calculated for the character blocks, and then dividing the summed value by the total number TCN of the character blocks.

In step 445, the average energy ratio $<R^k>$ of the character blocks is compared with a threshold Bth to determine whether or not the input image is blurred. The threshold Bth can be selected based on whether or not character information of the image can be visually recognized and performance of a binarization output of the image. If it is determined in step 445 that the average energy ratio $<R^k>$ of the character blocks is lower than the threshold Bth, the input image is determined as recognizable image and this is notified to the recognition part 150 in step 447. The recognition part 150 then performs a recognition operation on the image received from the input part 110. However, if it is determined in step 445 that the average energy ratio $<R^k>$ of the character blocks is higher than or equal to the threshold Bth, the input image is determined to be a blurred image, and a re-input request signal is provided to the input part 110.

Figure 10:
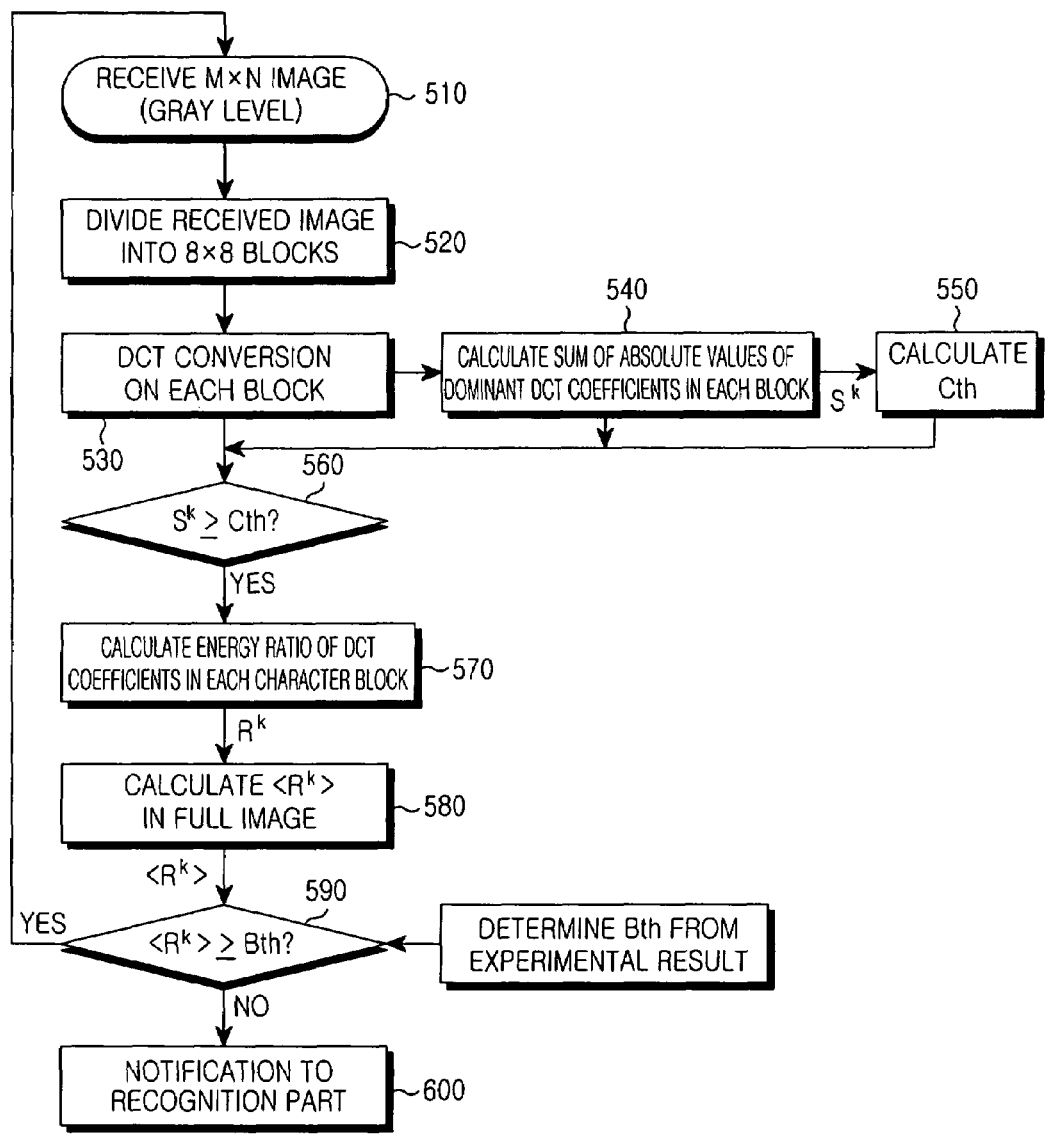
FIG. 10 is a flowchart illustrating a procedure for detecting blurring of an image according to an embodiment of the present invention.

FIG. 10 is a flowchart illustrating a procedure for detecting blurring of an input image according to an embodiment of the present invention. FIGS. 11A through 11E are diagrams illustrating images generated in the process of performing the procedure of FIG. 10.

Figure 11A:
FIGS. 11A through 11E are diagrams illustrating images generated in the process of performing the procedure of FIG. 10.
Figure 11B:
Figure 11C:
Figure 11D:
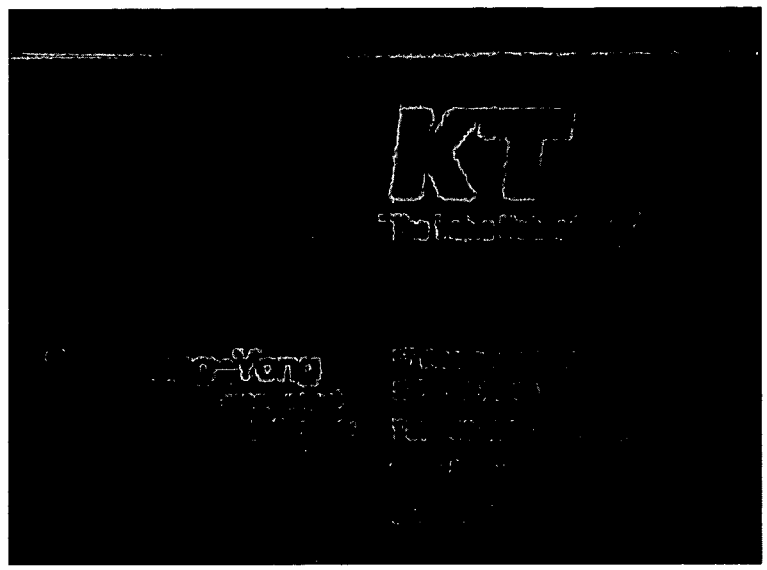
Figure 11E:
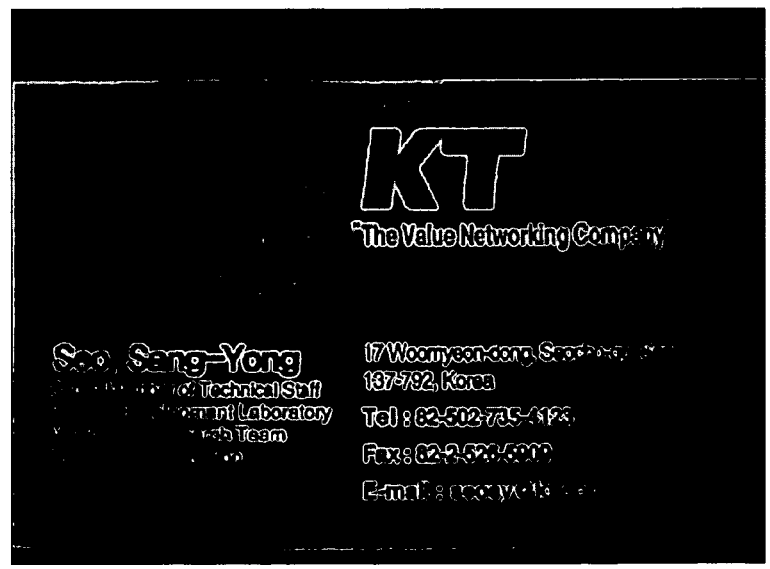

Referring to FIG. 10, in step 510, the input part 110 receives an input image shown in FIG. 1A. The received image has a size of 640×480 pixels. In step 520, the block division part 211 divides the image of FIG. 11A into blocks with a predetermined size shown in FIG. 11B. Each of the blocks has a size of 8×8 pixels, and the number of the divided blocks is 4800. Thereafter, in step 530, the DCT conversion part 213 DCT-converts the blocks divided by the block division part 211, and in step 540, the energy calculation part 215 calculates sums $S^k$ (k=BN=0, 1, ..., 4799) of absolute values of the dominant DCT coefficients of the DCT-converted blocks, and outputs the calculation results as energies of the respective blocks. In step 550, the threshold calculation part 217 calculates a threshold Cth by averaging the sums of absolute values of the dominant DCT coefficients of the blocks in accordance with Equation (2). The threshold Cth is a value determined by averaging the sums of absolute values of the dominant DCT coefficients of the blocks in the full image, and becomes a threshold used for classifying the blocks into character blocks and background blocks. Thereafter, in step 560, the block decision part 219 sequentially receives sums $S^k$ of absolute values of the dominant DCT coefficients for the blocks, and compares the value $S^k$ with the threshold Cth. As a result of the comparison, if the value $S^k$ is determined to be larger than or equal to the threshold Cth, the block decision part 219 classifies the corresponding block as a character block, and if the value $S^k$ is smaller than the threshold Cth, the block decision part 219 classifies the corresponding block as a background block. FIG. 11C is a diagram illustrating a character block classified by the block decision block 219. In step 570, the energy ratio calculation part 311 calculates energy ratios $R^k$ of the DCT coefficients for the classified character blocks in accordance with Equation (4), and in step 580, the energy ratio calculation part 313 calculates an average energy ratio $<R^k>$ of the character blocks in the full image by summing energy ratios of the DCT coefficients of the character blocks and averaging the sums in accordance with Equation (5). The blurring detection part 140 determines whether the input mage is blurred, by comparing the average energy ratio $<R^k>$ of the character blocks with the threshold Bth for blurring detection in accordance with Equation (6). If the average energy ratio $<R^k>$ of the character blocks is higher than or equal to the threshold Bth, the blurring detection part 140 returns to step 510, determining that the input image is a blurred image. FIG. 11D is a diagram illustrating an example of an image determined as a blurred image by the blurring detection part 140. However, if the average energy ratio <$R^k$> of the character blocks is lower than the threshold Bth, the blurring detection part 140 determines that the input image is a non-blurred image, and then proceeds to step 600 where it notifies the decision result to the recognition part 150. The recognition part 150 then performs an operation of recognizing characters in the image received from the input part 110. FIG. 11E is a diagram illustrating an example of an image determined as a recognizable image by the blurring detection part 140.

As described above, the embodiment of the present invention determines whether or not an input image is blurred in a preprocessing process prior to recognizing the image, thus contributing to an increase in a recognition rate. In addition, the embodiment of the present invention determines whether or not the input image is blurred only for character blocks, thereby simplifying the blurred image detection process.

While the invention has been shown and described with reference to a certain embodiment thereof, it will be understood by those skilled in the art that various changes in form and details may be made therein without departing from the spirit and scope of the invention as defined by the appended claims.

What is claimed is:

1. A device for determining whether or not an image is blurred, the device comprising:
   an input part for receiving an image;
   a block classification part for dividing the received image into blocks and classifying the divided blocks into character blocks and background blocks;
   a character block energy calculation part for calculating an average energy ratio of the character blocks; and
   a blurring detection part for determining whether or not the image is blurred based on a comparison of the average energy ratio with a predetermined threshold.

2. The device of claim 1, wherein the block classification part comprises:
   a block division part for dividing the received image in blocks with a predetermined size;
   a Discrete Cosine Transform (DCT) conversion part for DCT-converting the blocks output from the block division part;
   an energy calculation part for calculating a sum of absolute values of dominant DCT coefficients in each of the DCT-converted blocks, and outputting the sum as an energy value of the corresponding block;
   a threshold calculation part for summing the energy values of the respective blocks, output from the energy calculation part, and generating a threshold by dividing the summed energy value by the total number of the blocks, for averaging; and
   a block decision part for sequentially receiving the energy values of the blocks, output from the energy calculation part, and classifying the blocks as character blocks or background blocks based on a comparison of the received energy values with the threshold.

3. The device of claim 2, wherein each of the blocks has a size of 8×8 pixels, and the energy value of each block is calculated by $$S^k = \sum_{i=1}^{9} |D_i^k|$$

where $|D_i^k|$ denotes an $i^{th}$ dominant DCT coefficient of a $k^{th}$ block, and $S^k$ denotes a sum of absolute values of dominant DCT coefficients in the $k^{th}$ block.

4. The device of claim 2, wherein the character block energy calculation part comprises:
   an energy ratio calculation part for calculating an energy ratio of DCT coefficients of each of the classified blocks; and
   an average energy ratio calculation part for calculating an average energy ratio of character blocks by averaging energy ratios of the character blocks.

5. The device of claim 4, wherein the energy ratio calculation part calculates an energy ratio of DCT coefficients of each character block in accordance with the following equation (1), and the average energy ratio calculation part calculates an average energy ratio in accordance with the following equation (2);

$$R^k = \frac{\sum_{\substack{m \; n \\ (m,n) \in \Omega_L}} |L_{m,n}^k|}{\sum_{\substack{m \; n \\ (m,n) \in \Omega_L}} |L_{m,n}^k| + \sum_{\substack{m \; n \\ (m,n) \in \Omega_H}} |H_{m,n}^k|} \quad (1)$$

where, $$\Omega_L = \left\{(m, n) \mid m, n = 0, \ldots, M-1, m+n = 1, \ldots, \frac{M}{4}\right\};$$

$$\Omega_H = \left\{(m, n) \mid m, n = 0, \ldots, M-1, m+n = \frac{M}{4}+1, \ldots, \frac{3M}{4}\right\};$$

$L_{m,n}^k$ denotes a DCT coefficient of a low-frequency component in a (m, n) point of a $k^{th}$ block; and
$H_{m,n}^k$ denotes a DCT coefficient of a high-frequency component in a (m, n) point of a $k^{th}$ block, $$\langle R^k \rangle = \frac{1}{TCN} \sum_{k=1}^{TCN} R^k \quad (2)$$

where TCN denotes the total number of character blocks.

6. The device of claim 5, wherein in the energy ratio calculation part, m+n=1 and 2 for $L_{m,n}$, and m+n=3, 4, 5 and 6 for $H_{m,n}$.

7. A method for determining whether or not an image is blurred, the method comprising the steps of:
   receiving an image;
   dividing the received image into blocks and classifying the divided blocks into character blocks and background blocks;
   calculating an average energy ratio of the character blocks; and
   determining whether or not the image is blurred based on a comparison of the average energy ratio with a predetermined threshold.

8. The method of claim 7, wherein the block classification step further comprises the steps of:
   dividing the received image in blocks having a predetermined size;
   Discrete Cosine Transform (DCT) converting the blocks;
   calculating a sum of absolute values of dominant DCT coefficients, and outputting the sum as an energy value of a corresponding block;

summing the energy values of the respective blocks, and generating a threshold by dividing the summed energy value by the total number of the blocks for averaging; and sequentially receiving the energy values of the blocks, and classifying the blocks as character blocks or background blocks based on a comparison of the received energy values with the threshold.

9. The method of claim 8, wherein each of the blocks has a size of 8×8 pixels, and the energy value of each block is calculated by $$S^k = \sum_{i=1}^{9} |D_i^k|$$

where $|D_i^k|$ denotes an $i^{th}$ dominant DCT coefficient of a $k^{th}$ block, and $S^k$ denotes a sum of absolute values of dominant DCT coefficients in the $k^{th}$ block.

10. The method of claim 8, wherein the step of calculating the character block energy further comprises the steps of:
calculating an energy ratio of DCT coefficients of each of the classified blocks; and
calculating an average energy ratio of character blocks by averaging energy ratios of the character blocks.

11. The method of claim 10, wherein the step of calculating the energy ratio further comprises the steps of:
calculating an energy ratio of DCT coefficients of each character block in accordance with the following equation (1), and the average energy ratio calculation part calculates an average energy ratio in accordance with the following equation (2);

$$R^k = \frac{\sum_{\substack{m \ n \\ (m,n) \in \Omega_L}} |L_{m,n}^k|}{\sum_{\substack{m \ n \\ (m,n) \in \Omega_L}} |L_{m,n}^k| + \sum_{\substack{m \ n \\ (m,n) \in \Omega_H}} |H_{m,n}^k|} \quad (1)$$

where, $$\Omega_L = \left\{ (m, n) \mid m, n = 0, \ldots, M-1, m+n = 1, \ldots, \frac{M}{4} \right\};$$

$$\Omega_H = \left\{ (m, n) \mid m, n = 0, \ldots, M-1, m+n = \frac{M}{4}+1, \ldots, \frac{3M}{4} \right\};$$

$L_{m,n}^k$ denotes a DCT coefficient of a low-frequency component in a (m, n) point of a $k^{th}$ block; and $H_{m,n}^k$ denotes a DCT coefficient of a high-frequency component in a (m, n) point of a $k^{th}$ block, $$\langle R^k \rangle = \frac{1}{TCN} \sum_{k=1}^{TCN} R^k \quad (2)$$

where TCN denotes the total number of character blocks.

12. The method of claim 10, wherein for the step of calculating the energy ratio, m+n=1 and 2 for $L_{m,n}$, and m+n=3, 4, 5 and 6 for $H_{m,n}$.

* * * * *